United States Patent
Lu et al.

(10) Patent No.: US 11,706,754 B2
(45) Date of Patent: Jul. 18, 2023

(54) METHODS AND SYSTEMS FOR SCHEDULING MMWAVE COMMUNICATIONS AMONG CONNECTED VEHICLES

(71) Applicant: Toyota Motor Engineering & Manufacturing North America, Inc., Plano, TX (US)

(72) Inventors: Hongsheng Lu, San Jose, CA (US); Chenyuan He, Jiangsu (CN); Bin Cheng, New York, NY (US); Takayuki Shimizu, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 158 days.

(21) Appl. No.: 17/235,320

(22) Filed: Apr. 20, 2021

(65) Prior Publication Data
US 2022/0338214 A1  Oct. 20, 2022

(51) Int. Cl.
| | |
|---|---|
| *H04W 72/1263* | (2023.01) |
| *H04W 4/40* | (2018.01) |
| *H04W 72/0446* | (2023.01) |
| *H04W 72/02* | (2009.01) |
| *H04W 72/0453* | (2023.01) |
| *H04W 72/50* | (2023.01) |

(52) U.S. Cl.
CPC ......... *H04W 72/1263* (2013.01); *H04W 4/40* (2018.02); *H04W 72/02* (2013.01); *H04W 72/0446* (2013.01); *H04W 72/0453* (2013.01); *H04W 72/535* (2023.01)

(58) Field of Classification Search
CPC ... H04W 72/1263; H04W 4/40; H04W 72/02; H04W 72/0446; H04W 72/0453; H04W 72/1257; H04W 4/46
See application file for complete search history.

(56) References Cited

U.S. PATENT DOCUMENTS

| | | | |
|---|---|---|---|
| 2019/0239040 A1* | 8/2019 | Va | H04W 72/02 |
| 2020/0029318 A1* | 1/2020 | Guo | H04W 72/042 |
| 2021/0006362 A1 | 1/2021 | Loehr et al. | |

FOREIGN PATENT DOCUMENTS

| | | |
|---|---|---|
| CN | 112237043 A | 1/2021 |
| WO | 2020028662 A1 | 2/2020 |

(Continued)

OTHER PUBLICATIONS

Perfecto et al., IEEE "MillimeterWave V2V Communications: Distributed Association and Beam Alignment", May 30, 2017 (Year: 2017).*

(Continued)

*Primary Examiner* — Chae S Lee
(74) *Attorney, Agent, or Firm* — Dinsmore & Shohl LLP

(57) ABSTRACT

A vehicle includes a processor configured to transmit a mmWave beacon signal during a probe phase of a first period; receive one or more mmWave beacon signals from one or more vehicles; generate a mmWave communication intention message for another period that is after the first period based on the received one or more mmWave beacon signals; and broadcast, during the first period, a packet including a mmWave transmission schedule for the another period generated based on the mmWave communication intention message.

20 Claims, 11 Drawing Sheets

(56) References Cited

FOREIGN PATENT DOCUMENTS

WO     2020143583 A1    7/2020
WO     2021014411 A1    1/2021

OTHER PUBLICATIONS

Baldomero Coll-Perales, et al., "Sub-6GHz Assisted MAC for Millimeter Wave Vehicular Communications", IEEE Communications Magazine, vol. 57, No. 3, pp. 125-131, Mar. 2019.
Akihito Taya, et al., "Concurrent Transmission Scheduling for Perceptual Data Sharing in mmWave Vehicular Networks", Journal IEICE Transactions on Information and Systems, vol. E102-D, No. 5, Mar. 22, 2019.
Rafael Molina-Masegosa, et al., "System Level Evaluation of LIE-V2V Mode 4 Communications and its Distributed Scheduling", Journal IEEE 85th Vehicular Technology Conference (VTC Spring), pp. 1-5, Nov. 16, 2017.

\* cited by examiner mmWave radio communication During Data Exchange Phase within slot Sx

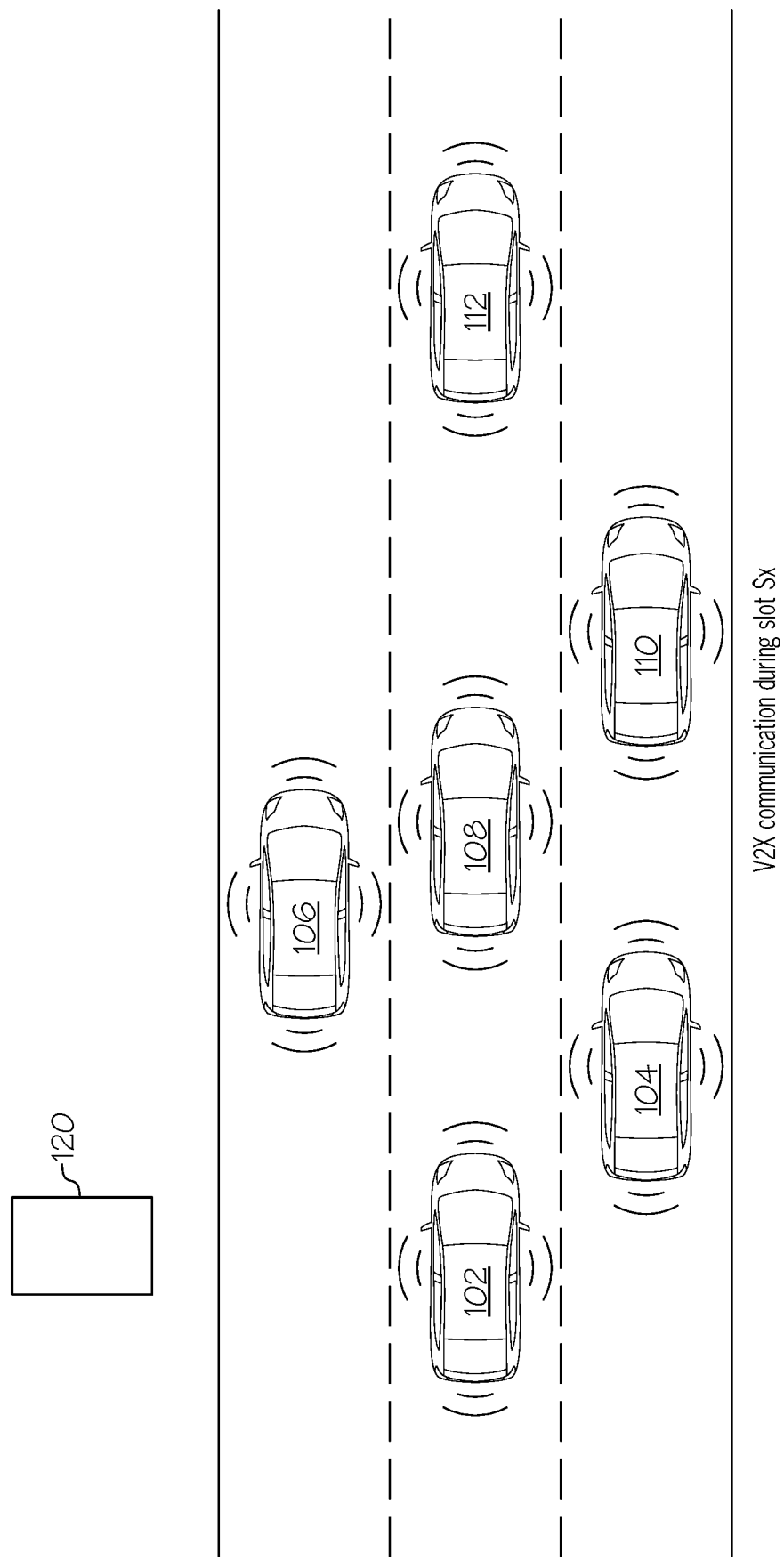

mmWave radio communication During Data Exchange Phase within slot $S_{X+2}$

| | Sx-2 | | Sx-1 | | Sx | | Sx+1 | | Sx+2 | |
|---|---|---|---|---|---|---|---|---|---|---|
| | Probe phase | Data exchange phase | Probe phase | Data exchange phase | Probe phase | Data exchange phase | Probe phase | Data exchange phase | Probe phase | Data exchange phase |
| mmWave channel | hello beacon signals | Data exchange per the schedule converged during Sx-3 | hello beacon signals | Data exchange per the schedule converged during Sx-2 | hello beacon signals | Data exchange per the schedule converged during Sx-1 | hello beacon signals | Data exchange per the schedule converged during Sx | hello beacon signals | Data exchange per the schedule converged during Sx+1 |
| V2X channel | Host's TS for Sx is computed based on Host's CI for Sx and overheard others' CI for Sx<br><br>5.9GHz packet includes:<br>- Host's CI for Sx<br>(determined based on transmitted and received hello beacon signals and host's V2X applications' needs)<br>- Host's TS for Sx<br>- The best (i.e., the one with largest utility value) of Others' TS for Sx-1 overheard during Sx-3<br><br>Converging process:<br>Converging Others' TS for Sx-1 to obtain TS for Sx-1 that has the maximum Σ | | Host's TS for Sx+1 is computed based on Host's CI for Sx+1 and overheard others' CI for Sx+1<br><br>5.9GHz packet includes:<br>- Host's CI for Sx+1<br>(determined based on transmitted and received hello beacon signals)<br>- Host's TS for Sx+1<br>- The best (i.e., the one with largest utility value) of Others' TS for Sx overheard during Sx-2<br><br>Converging process:<br>Converging others' TS for Sx to obtain TS for Sx that has the maximum Σ | | Host's TS for Sx+2 is computed based on Host's CI for Sx+2 and overheard others' CI for Sx+2<br><br>5.9GHz packet includes:<br>- Host's CI for Sx+2<br>(determined based on transmitted and received hello beacon signals)<br>- Host's TS for Sx+2<br>- The best (i.e., the one with largest utility value) of Others' TS for Sx+1 overheard during Sx-1<br><br>Converging process:<br>Converging others' TS for Sx+1 to obtain TS for Sx+1 that has the maximum Σ | | Host's TS for Sx+3 is computed based on Host's CI for Sx+3 and overheard others' CI for Sx+3<br><br>5.9GHz packet includes:<br>- Host's CI for Sx+3<br>(determined based on transmitted and received hello beacon signals)<br>- Host's TS for Sx+3<br>- The best (i.e., the one with largest utility value) of Others' TS for Sx+2 overheard during Sx<br><br>Converging process:<br>Converging others' TS for Sx+2 to obtain TS for Sx+2 that has the maximum Σ | | Host's TS for Sx+4 is computed based on Host's CI for Sx+4 and overheard others' CI for Sx+4<br><br>5.9GHz packet includes:<br>- Host's CI for Sx+4<br>- Host's TS for Sx+4<br>- The best (i.e., the one with largest utility value) of Others' TS for Sx+3 overheard during Sx+1<br><br>Converging process:<br>Converging others' TS for Sx+3 to obtain TS for Sx+3 that has the maximum Σ | |

METHODS AND SYSTEMS FOR SCHEDULING MMWAVE COMMUNICATIONS AMONG CONNECTED VEHICLES

TECHNICAL FIELD

The present disclosure relates to methods and systems for scheduling mmWave communications among connected vehicles.

BACKGROUND

A mobile operating environment includes connected vehicles traveling at roadway speeds. One challenge to deploying millimeter wave (mmWave) communication technologies in mobile environments is that mmWave communication typically includes an execution of a beam alignment process. The mmWave communication between two endpoints is generally not possible without first completing the beam alignment process between these two endpoints. For example, appropriate beam pointing between a transmitter (e.g., a first endpoint) and a receiver (e.g., a second endpoint) is needed before exchanging data between the transmitter and the receiver.

IEEE 802.11ad is a standard that defines for using mmWave to achieve high data throughput among devices. However, the scenario targeted by 802.11ad is indoor environment. When applied to vehicle-to-everything (V2X) scenarios, the link establishment process that involves sending out beacons to announce its service and to help interested users to join the network, seems tedious in the fleeting moment that two vehicles encounter with each other.

Accordingly, a need exists for improving the link establishment process for implementing mmWave communication among connected vehicles.

SUMMARY

The present disclosure provides systems and methods for scheduling mmWave communications among connected vehicles.

In one embodiment, a vehicle includes a processor configured to transmit a mmWave beacon signal during a probe phase of a first period; receive one or more mmWave beacon signals from one or more vehicles; generate a mmWave communication intention message for another period that is after the first period based on the received one or more mmWave beacon signals; and broadcast, during the first period, a packet including a mmWave transmission schedule for the another period generated based on the mmWave communication intention message.

In another embodiment, a method for scheduling mmWave transmissions is provided. The method includes transmitting, by a host vehicle, a mmWave beacon signal during a probe phase of a first period; receiving, by the host vehicle, one or more mmWave beacon signals from one or more vehicles; generating, by the host vehicle, a mmWave communication intention message for another period that is after the first period based on the received one or more mmWave beacon signals; and broadcasting, by the host vehicle, during the first period, a packet including a mmWave transmission schedule for the another period generated based on the mmWave communication intention message.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 5C depicts broadcasting of V2X packets during slot $S_x$, according to one or more embodiments shown and described herein;

FIG. 9 depicts communication over mmWave channel and V2X channel over slots $S_{x-2}$ through $S_{x+2}$ from the perspective of a host vehicle, according to one or more embodiments shown and described herein.

DETAILED DESCRIPTION

The embodiments disclosed herein include a periodic-centralized mmWave scheduler which establishes links among multiple connected vehicles. In order to leverage mmWave's high throughput for vehicular communications, the link establishment process needs to be improved. One way is to leverage 5.9 GHz V2X technology (e.g., Dedicated Short Range Communication (DSRC), LTE-V2X) as a control channel for mmWave communications. Namely, the steps of service announcement and joining network may be conducted over 5.9 GHz V2X technology. Since 5.9 GHz V2X has a communication range much larger than that of mmWave technology (i.e., 1 kilometer versus 200 meters) and it is a broadcasting technology, vehicles may finish handshaking quicker at a longer distance, leaving time to calculate appropriate schedule for mmWave transmissions when vehicles fall into each other's mmWave communication range.

Figure 3:
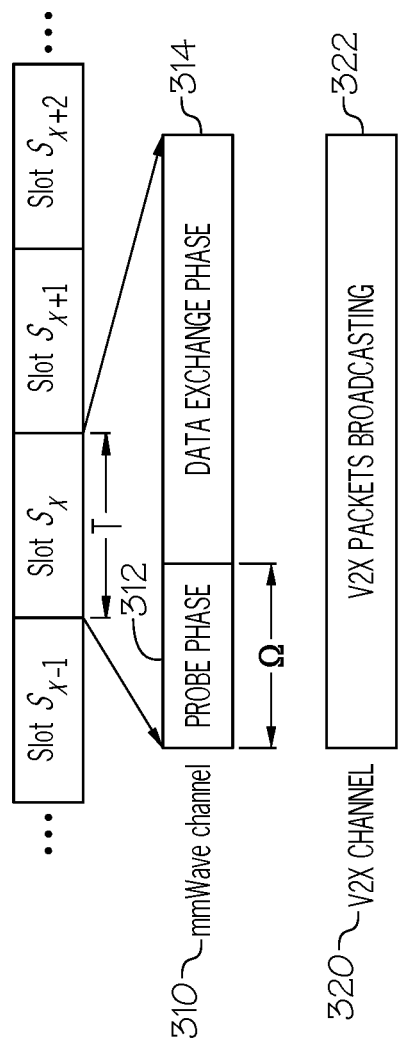
FIG. 3 depicts a schematic communication timetable for implementing mmWave transmission, according to one or more embodiments shown and described herein.
Figure 5A:
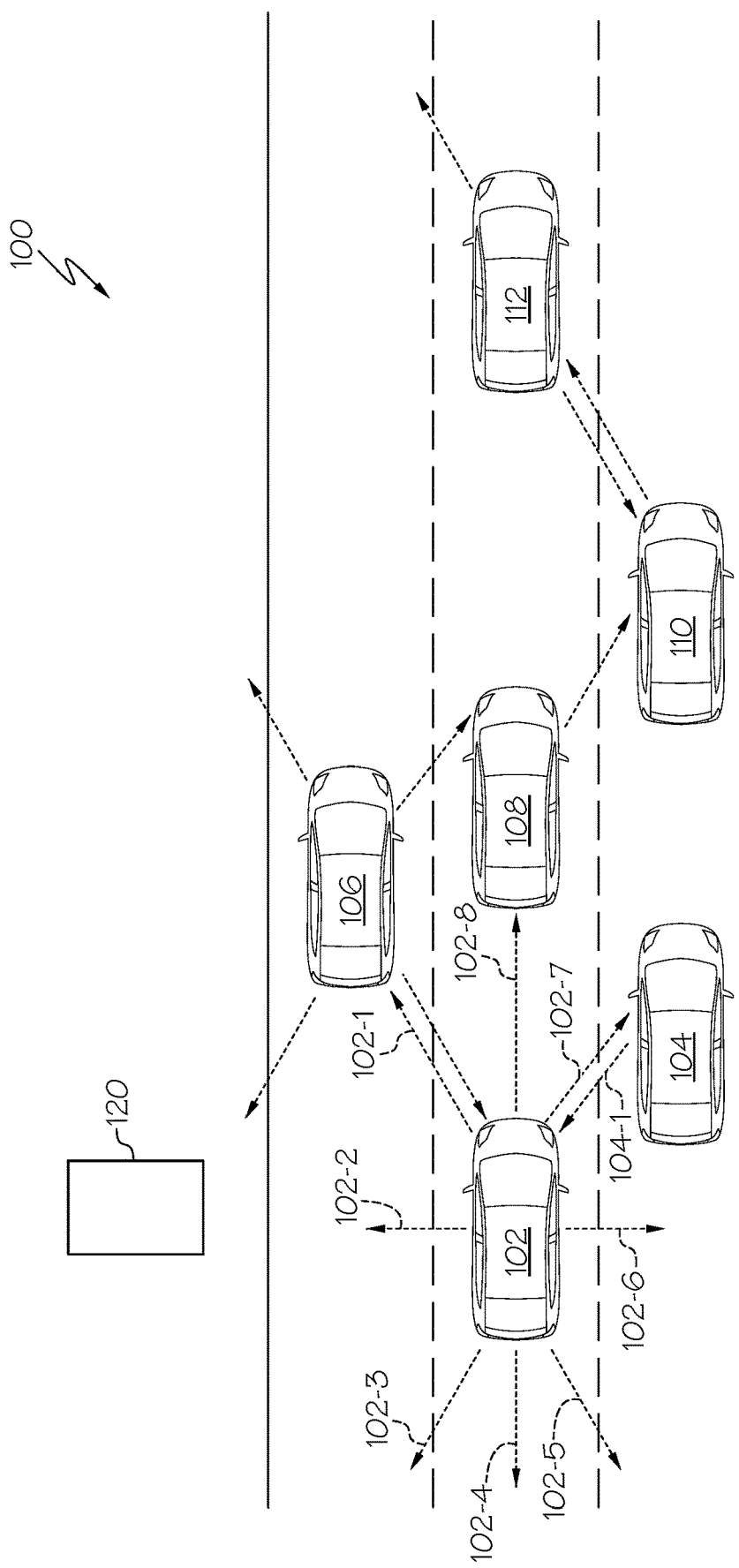
FIG. 5A depicts connected vehicles transmitting hello beacon signals during a probe phase within slot $S_x$, according to one or more embodiments shown and described herein.
Figure 5B:
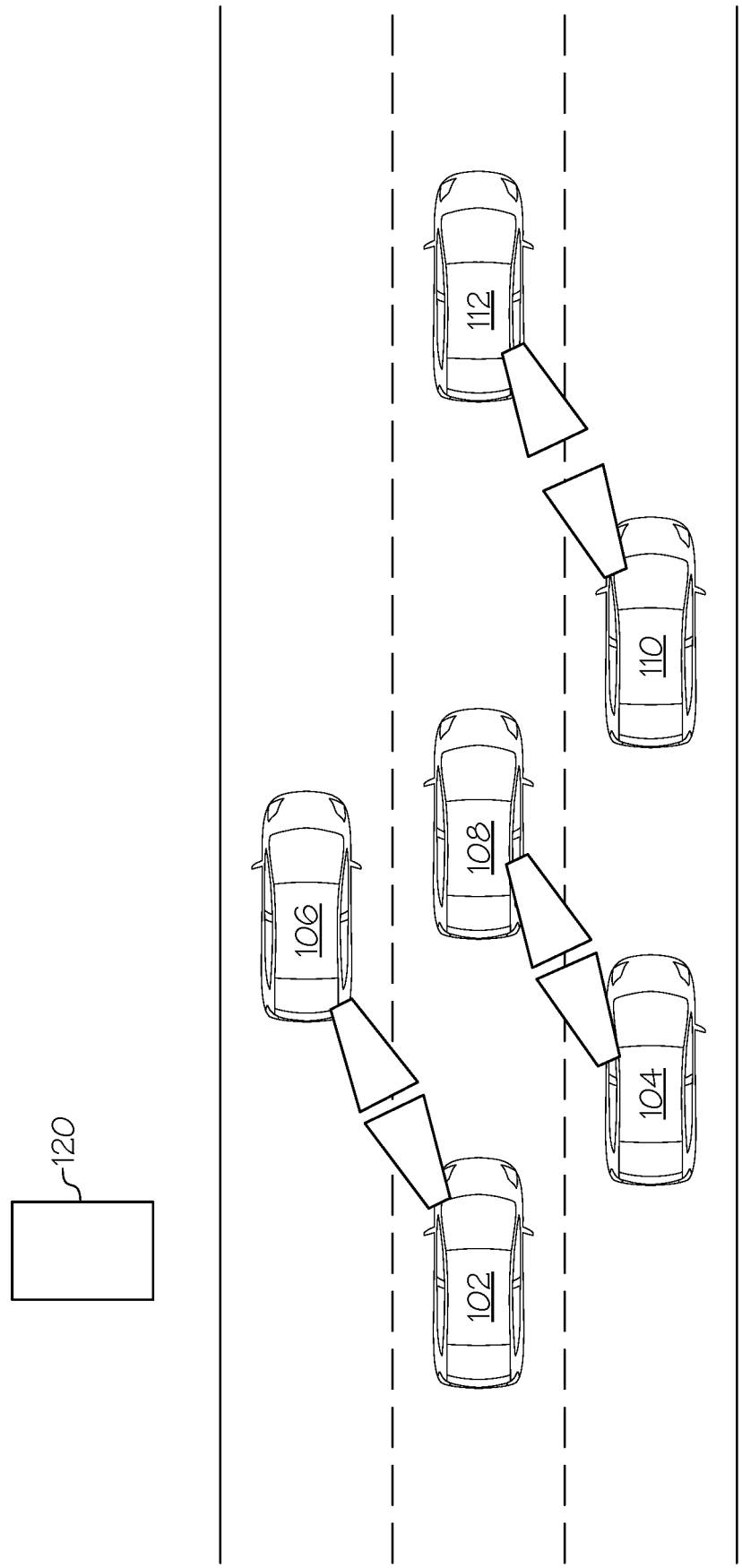
FIG. 5B depicts connected vehicles performing mmWave communication during a data exchange phase within slot $S_x$, according to one or more embodiments shown and described herein.

The present disclosure utilize the handshaking process over V2X technology such as 5.9 GHz DSRC V2X technology for the schedulers. By referring to FIGS. 1, 3, 5A, 5B, and 5C, a plurality of connected vehicles 102, 104, 106, 108, 110, 112 schedule and implement mmWave transmissions. Some or all of the connected vehicles 102, 104, 106, 108, 110, 112 and a server 120 may run their mmWave schedulers. The mmWave schedulers may have the same or different designs. During slot $S_x$ having a period of T illustrated in FIG. 3, each of the connected vehicles 102, 104, 106, 108, 110, 112 may implement mmWave communication and 5.9 GHz V2X communication. The mmWave communication during slot $S_x$ may include a probe phase and a data exchange phase as illustrated in FIG. 3. During the probe phase within the slot $S_x$, all or some of the connected vehicles 102, 104, 106, 108, 110, 112 may transmit hello beacon signals to inform their presence via mmWave radio, as illustrated in FIG. 5A. During the data exchange phase within the slot $S_x$, the connected vehicles 102, 104, 106, 108, 110, 112 may perform mmWave transmissions via mmWave radio based on previously determined schedules, as illustrated in FIG. 5B.

During slot $S_x$, the 5.9 GHz V2X communication is illustrated in FIG. 5C. In contrast with directional communication of mmWave, the 5.9 GHz V2X communication is omni-directional and reaches farther than mmWave. Each of the connected vehicles 102, 104, 106, 108, 110, 112 may broadcast packets that include communication intentions and transmission schedules for future slots illustrated in FIG. 9 which will be described in detail below. The scheduler of each of the connected vehicles 102, 104, 106, 108, 110, 112 may select one of the transmission schedules that has the largest utility value.

According to the present disclosure, each connected vehicle transmits communication intentions and transmission schedules for a future slot to other connected vehicles, and the scheduler of each of the connected vehicles may implement converging process to select one of the transmission schedules that has the largest utility value. Then, the selected schedule is utilized for mmWave communication during the future slot. In this regard, the present system enables mmWave schedulers to work in practical and efficient manners.

Figure 1:
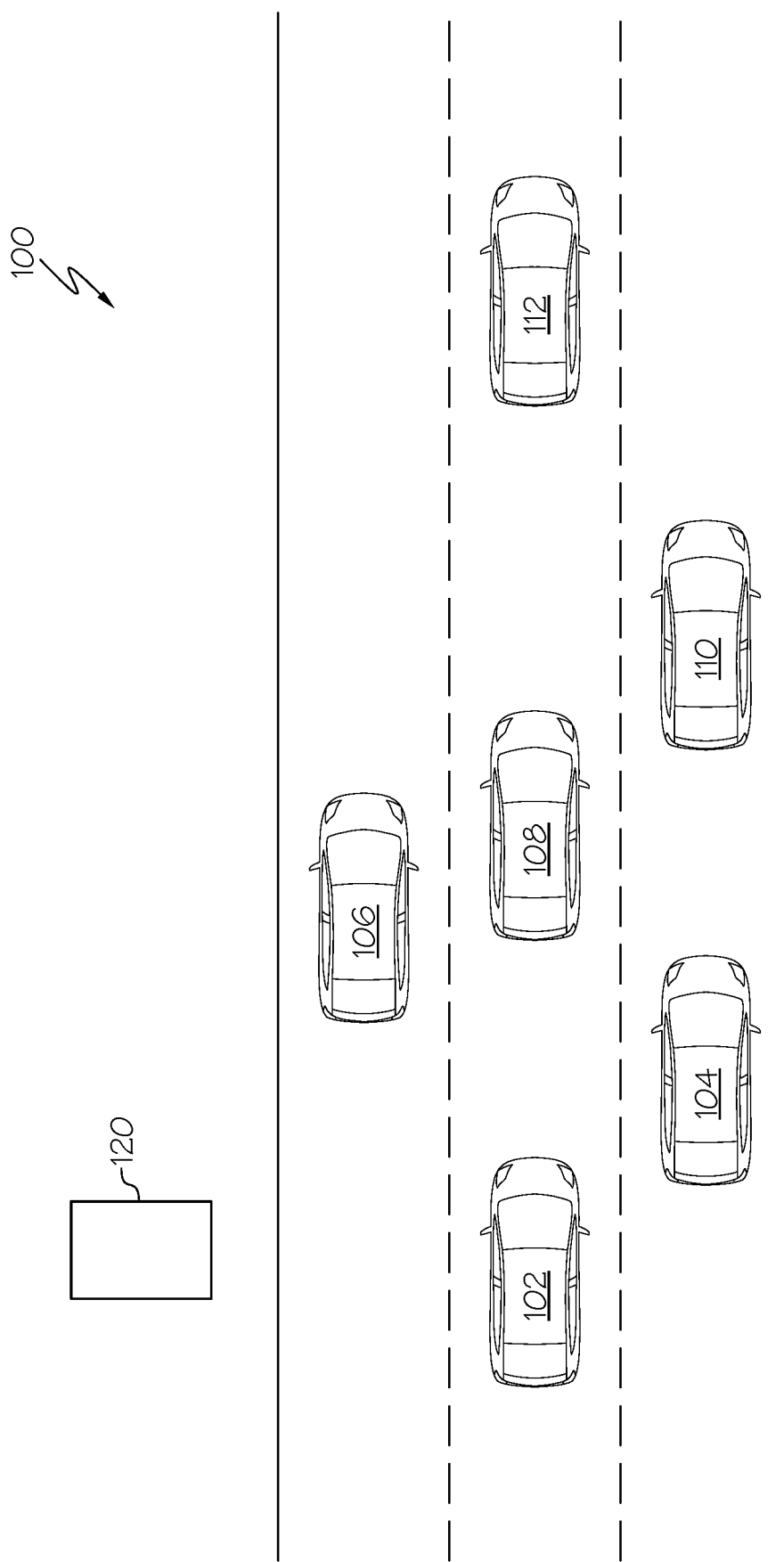
FIG. 1 schematically depicts a system for scheduling mmWave communication among multiple connected vehicles, according to one or more embodiments shown and described herein.

FIG. 1 schematically depicts a system for scheduling mmWave communication among multiple connected vehicles, according to one or more embodiments shown and described herein.

In embodiments, the system 100 may include a plurality of connected vehicles 102, 104, 106, 108, 110, 112, and a server 120. While FIG. 1 illustrates six connected vehicles 102, 104, 106, 108, 110, 112 conducting mmWave communication, more than or less than six connected vehicles may communicate with each other via mmWave communication.

Each of the connected vehicles 102, 104, 106, 108, 110, 112 may communicate with the server 120 via mmWave communication and/or V2X communication. The server 120 may be a remote server such as a cloud server. In some embodiments, the server 120 may be a local server including, but not limited to, a roadside unit, an edge server, and the like. The server 120 may communicate with vehicles in an area covered by the server 120. The server 120 may communicate with other servers that cover different areas. The server 120 may communicate with a remote server and transmit information collected by the server 120 to the remote server. The server 120 may include its own scheduler mmWave communication.

Each of the connected vehicles 102, 104, 106, 108, 110, 112 may be a vehicle including an automobile or any other passenger or non-passenger vehicle such as, for example, a terrestrial, aquatic, and/or airborne vehicle. In some embodiments, one or more of the connected vehicles 102, 104, 106, 108, 110, 112 may be an unmanned aerial vehicle (UAV), commonly known as a drone.

Each of the connected vehicles 102, 104, 106, 108, 110, 112 may be equipped with communication hardware for V2X DSRC and mmWave communication. For example, each of the connected vehicles 102, 104, 106, 108, 110, 112 may be equipped with a DSRC transceiver and a mmWave transceiver. Each of the connected vehicles 102, 104, 106, 108, 110, 112 may communicate each other over two different channels (e.g., DSRC channel and mmWave channel) independently. Details of communication over DSRC channel will be described in detail with reference to FIGS. 5A, 5B, and 9 below. Details of communication over mmWave channel will be described in detail with reference to FIGS. 5C and 9 below.

Figure 2:
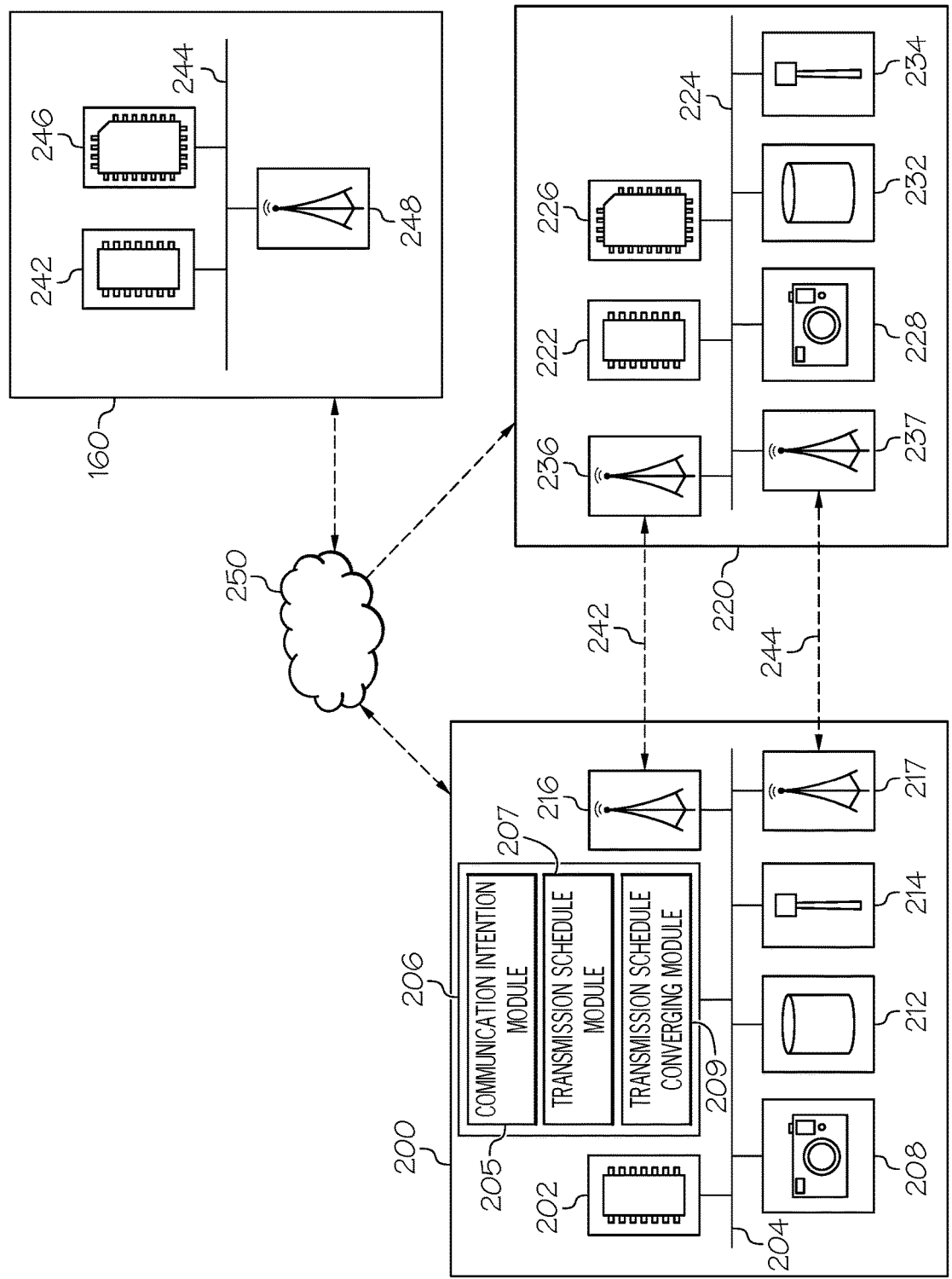
FIG. 2 depicts a schematic diagram a system for scheduling mmWave communication among multiple connected vehicles, according to one or more embodiments shown and described herein.

FIG. 2 depicts a schematic diagram a system for scheduling mmWave communication among multiple connected vehicles, according to one or more embodiments shown and described herein. The system includes connected vehicle systems 200 and 220, and the server 160.

It is noted that, while the connected vehicle systems 200 and 220 are depicted in isolation, each of the connected vehicle systems 200 and 220 may be included within a vehicle in some embodiments, for example, respectively within each of the connected vehicles 102, 104, 106, 108, 110, 112 of FIG. 1. In embodiments in which each of the connected vehicle systems 200 and 220 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The connected vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The connected vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the connected vehicle system 200.

The one or more memory modules 206 includes a communication intention module 205, a transmission schedule module 207, and a transmission schedule converging module 209. The communication intention module 205, the transmission schedule module 207, and the transmission schedule converging module 209 as a whole may operate as a scheduler for scheduling mmWave communication. Each of the communication intention module 205, the transmission schedule module 207, and the transmission schedule converging module 209 may be a program module in the form of operating systems, application program modules, and other program modules stored in one or more memory modules 206. In some embodiments, the program module may be stored in a remote storage device that may communicate with the connected vehicle system 200. Such a program module may include, but is not limited to, routines, subroutines, programs, objects, components, data structures and the like for performing specific tasks or executing specific data types as will be described below.

The communication intention module 205 may determine the communication intention of the connected vehicle (e.g., the connected vehicle 102 in FIG. 1) for a future time period (e.g., slot $S_{x+2}$ in FIG. 3 given the current time being within slot $S_x$) based on hello beacon signals received by the connected vehicle. The hello beacon signals are directional beacon signals transmitted by a vehicle over mmWave radio as illustrated in FIG. 5A. For example, the connected vehicle 102 may determine its communication intention for a future period based on beacon signals received from a set of connected vehicles.

Referring back to FIG. 2, the transmission schedule module 207 may determine the transmission schedule of the connected vehicle for a future time period based on the connected vehicle's communication intention for the future time period and communication intentions of other connected vehicles for the future time period overheard by the connected vehicle. The transmission schedule module 207 may determine the transmission schedule that does not have a conflict among the connected vehicles based on the connected vehicle's communication intention for the future time period and communication intentions of other connected vehicles for the future time period. For example, by referring to FIG. 1, if the communication intention of the connected vehicle 102 for a future time period is to communicate with the connected vehicle 106, and the communication intention of the connected vehicle 108 for the future time period is to communicate with the connected vehicle 106 also, there is a conflict because both of the connected vehicles 102 and 108 intend to communicate with the connected vehicle 106 at the same time. In this case, the transmission schedule module 207 of the connected vehicle 102 may determine, as the transmission schedule for the future time period, transmission between the connected vehicle 102 and the connected vehicle 104 instead of transmission between the connected vehicle 102 and the connected vehicle 106 in order to avoid the conflict. Alternatively, the transmission schedule module 207 of the connected vehicle 102 may determine, as the transmission schedule for the future time period, transmission between the connected vehicle 102 and the connected vehicle 106, and the transmission schedule module of the connected vehicle 108 may determine, as the transmission schedule for the future time period, transmission between the connected vehicle 108 and the connected vehicle 110 instead of transmission between the connected vehicle 108 and the connected vehicle 106 in order to avoid the conflict.

Referring back to FIG. 2, the transmission schedule converging module 209 converges a plurality of transmission schedules overheard by the connected vehicle system 200. For example, during slot $S_{x-1}$ in FIG. 3, the connected vehicle system 200 overheard a plurality of transmission schedules for slot $S_{x+1}$ transmitted by other connected vehicles. Then, during slot $S_x$ in FIG. 3, the transmission schedule converging module 209 converges the plurality of transmission schedules for slot $S_{x+1}$ by selecting the transmission schedule that has the largest utility value among the transmission schedules. The utility value may be defined based on throughputs of mmWave transmission among connected vehicles according to the corresponding transmission schedule.

Referring still to FIG. 2, the connected vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate the connected vehicle 102.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the connected vehicle system 200.

The connected vehicle system 200 comprises a satellite antenna 214 coupled to the communication path 204 such that the communication path 204 communicatively couples the satellite antenna 214 to other modules of the connected vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The connected vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the connected anchor vehicle 102. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the connected vehicle system 200 comprises V2X network interface hardware 216 for communicating data with connected vehicles, the server 160 or other infrastructures. The V2X network interface hardware 216 may enable various V2X communication including, but not limited to, 5.9 GHz DSRC, LTE-V2X, LTE-D2D, 5G-V2X, ITS-G5, ITS-Connect, LPWAN, visible light communication, and the like. The V2X network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the V2X network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the V2X network interface hardware 216 includes hardware configured to operate in accordance with the Bluetooth® wireless communication protocol. The V2X network interface hardware 216 of the connected vehicle system 200 may transmit its data to the connected vehicle system 220 or the server 160. For example, the V2X network interface hardware 216 of the connected vehicle system 200 may transmit packets that include the communication intentions of the connected vehicle system 200, the transmission schedule of the connected vehicle system 200, and transmission schedule of other vehicle system.

Still referring to FIG. 2, the connected vehicle system 200 comprises mmWave interface hardware 217 for communicating data with connected vehicles, the server 160 or other infrastructures. The mmWave interface hardware 217 may enable the connected vehicle system 200 to perform directional mmWave communication with another connected vehicle. For example, by referring to FIG. 5B, the mmWave interface hardware 217 of the connected vehicle 102 allows the connected vehicle 102 to communicate with the connected vehicle 106 over mmWave radios. While FIG. 2 illustrates the V2X network interface hardware 216 and the mmWave interface hardware 217 separately, the connected vehicle system 200 may include a single interface hardware that provides both V2X and mmWave communication functionalities.

The connected vehicle system 200 may connect with one or more external vehicle systems (e.g., the connected vehicle system 220) and/or external processing devices (e.g., the server 160) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the connected vehicle system 200 may be communicatively coupled to the server 160 by the network 250. In one embodiment, the network 250 may include one or more computer networks (e.g., a personal area network, a local area network, or a wide area network), cellular networks, satellite networks and/or a global positioning system and combinations thereof. Accordingly, the connected vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (WiFi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 160 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include a transmission schedule converging module similar to the transmission schedule converging module 209. The transmission schedule converging module of the server 160 may obtain transmission schedules transmitted by connected vehicles and select one that has the largest utility value among the transmission schedules. Then, the server 160 may broadcast the selected transmission schedule to connected vehicles within a region managed by the server 160. The communication path 244 may be similar to the communication path 204 in some embodiments.

Still referring to FIG. 2, the connected vehicle system 220 includes one or more processors 222, one or more memory modules 226, one or more sensors 228, one or more vehicle sensors 232, a satellite antenna 234, V2X network interface hardware 236, mmWave interface hardware 237 and a communication path 224 communicatively connected to the other components of the connected vehicle system 220. The components of the connected vehicle system 220 may be structurally similar to and have similar functions as the corresponding components of the connected vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, the V2X network interface hardware 236 corresponds to the V2X network interface hardware 216, and the mmWave interface hardware 237 corresponds to the mmWave interface hardware 217).

FIG. 3 depicts a schematic communication timetable for implementing mmWave transmission, according to one or more embodiments shown and described herein.

In embodiments, time is slotted with a duration T, starting from slot $S_0$. For each slot, connected vehicles communicate with each other over both the mmWave channel 310 and the V2X channel 320. At the beginning of each slot of the mmWave channel 310, there is a probe phase 312 of duration $\Omega$. During the probe phase 312, connected vehicles send out hello beacon signals through different sectors of their mmWave radios. For example, by referring to FIG. 5A, the connected vehicle 102 transmits its hello beacon signals 102-1 through 102-8 through different sectors of its mmWave radio. The timing of a vehicle to send a hello beacon signal at a particular antenna sector is randomized across the duration Q. In some embodiments, the duration Q may vary. Each of connected vehicles may participate some or all probing phases along the time.

During the data exchange phase 314 of slot $S_x$, connected vehicles perform mmWave transmission based on a transmission schedule that is converged and determined during the previous slot $S_{x-1}$. For example, as illustrated in FIG. 5B, during the data exchange phase 314 of slot $S_x$, the connected vehicles 102 and 106 perform mmWave transmissions, the connected vehicles 104 and 108 perform mmWave transmissions, and the connected vehicles 110 and 112 perform mmWave transmissions based on the transmission schedule that is converged and determined during the previous slot $S_{x-1}$. The details of the converging process is described below with reference to FIGS. 4 and 9 below.

Over the V2X channel 320, each of the connected vehicles transmits its V2X packets. In embodiments, over the V2X channel 320 such as 5.9 GHz V2X radio, connected vehicles broadcast their communication intentions (e.g., whom one wants to talk to at what time and for how long). These communication intentions may be piggybacked to existing 5.9 GHz V2X messages (e.g., basic safety message (BSM)) or transmitted as separated packets. In the V2X packet that contains a connected vehicle's communication intention, the connected vehicle may insert a mmWave transmission schedule that the connected vehicle computes for a future time period (e.g., slot $S_{x+2}$), assuming the current time resides in slot $S_x$. This mmWave transmission schedule is computed by the connected vehicle based on its own communication intention for slot $S_{x+2}$ as well as the communication intentions targeted for slot $S_{x+2}$ that the connected vehicle overheard from the beginning of slot $S_x$ over the V2X channel 320 from other surrounding connected vehicles. The computed mmWave transmission schedule may be characterized by a parameter $\Sigma$ (e.g., the throughput that the mmWave transmission schedule offers in $S_{x+2}$) as an indicator of its quality.

In addition, in the V2X packet that contains the connected vehicle's communication intention, the connected vehicle may insert a mmWave transmission schedule computed for slot $S_{x+1}$ that the connected vehicle overheard from V2X packets transmitted during $S_{x-1}$. If more than one schedule was overheard, the connected vehicle may use the one with largest $\Sigma$.

Figure 4:
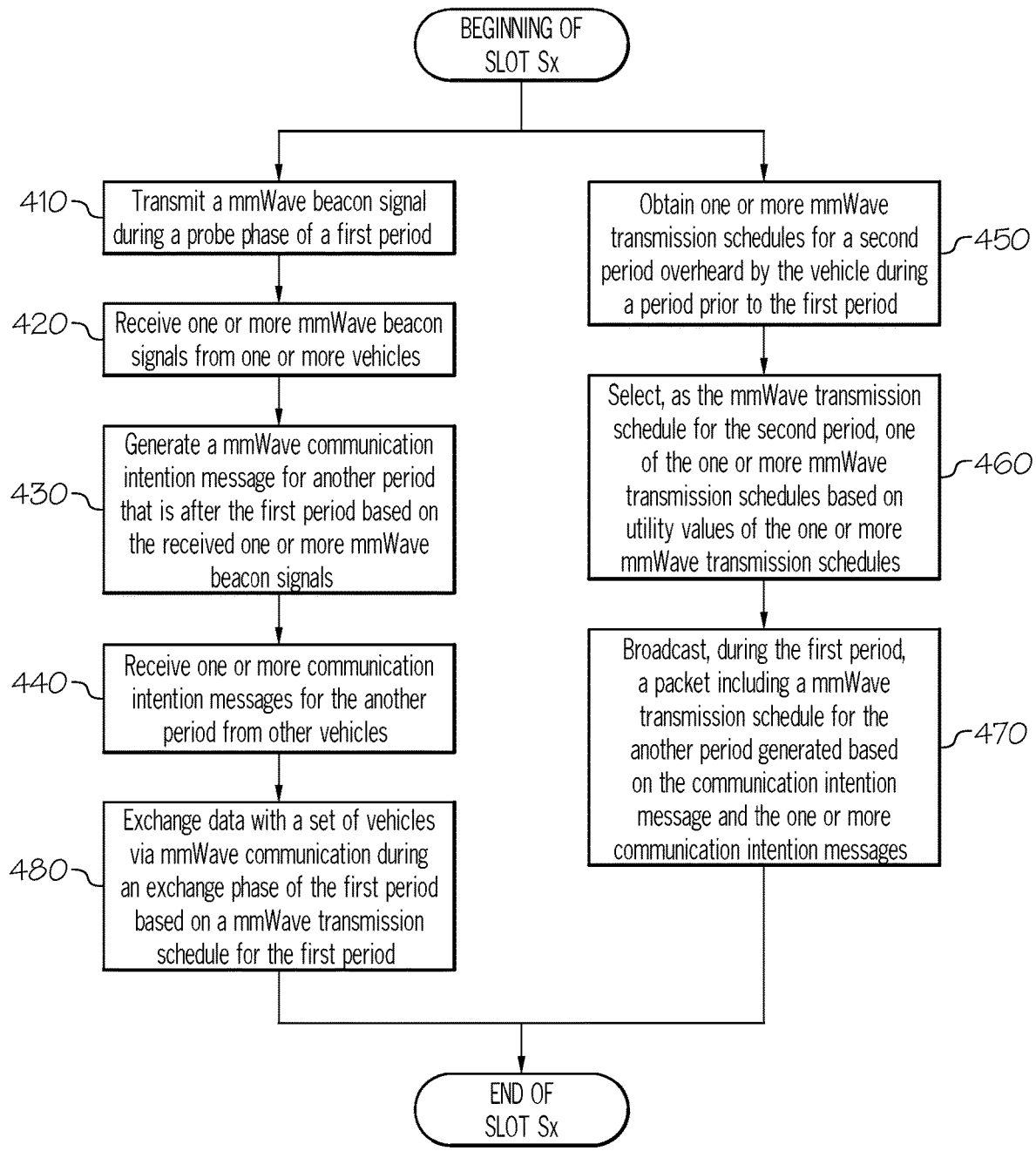
FIG. 4 depicts a flowchart for scheduling mmWave communication among a plurality of connected vehicles, according to one or more embodiments shown and described herein.

FIG. 4 depicts a flowchart for scheduling mmWave communication among a plurality of connected vehicles, according to one or more embodiments shown and described herein. The flowchart is described with reference to FIGS. 3, 5A, 5B, and 5C. In FIG. 4, the steps 410, 420, 430, 440, and 480 may be implemented in a sequential order, and the steps 450, 460, and 470 may be implemented in a sequential order. The set of steps 410, 420, 430, 440, and 480 and the set of steps 450, 460 and 470 may be implemented in parallel.

In step 410, a connected vehicle (e.g., a host vehicle) transmits a mmWave hello beacon signal during a probe phase of a first period. In embodiment, a connected vehicle may transmit mmWave beacon signals during the probe phase 312 of slot $S_x$. For example, the connected vehicle 102 may transmit hello beacon signals 102-1 through 102-8 through different sectors of its mmWave radios. The timing of the connected vehicle 102 to send a hello beacon signal at a particular antenna sector is randomized across the duration Q of the probe phase 312. Other connected vehicles 104, 106, 108, 110, 112 may also transmit mmWave hello beacon signals during the probe phase 312 of slot $S_x$ through different sectors of their mmWave radios. For example, the connected vehicle 106 may transmit beacons signals through four different sectors of its mmWave radios, the connected vehicle 112 may transmit hello beacon signals through two different sectors of its mmWave radios, and each of the connected vehicles 104, 108 and 110 may transmit a hello beacons signal through a single sector of its mmWave radio.

In step 420, the connected vehicle receives one or more mmWave hello beacon signals from one or more connected vehicles. In embodiments, the connected vehicle may receive one or more mmWave beacon signals from other connected vehicles during the probe phase 312 of slot $S_x$. For example, the connected vehicle 102 may receive mmWave beacon signals from the connected vehicles 104 and 106 during the probe phase 312 of slot $S_x$. Connected vehicles 104, 106, 108, 110, 112 may also receive mmWave beacon signals from other vehicles, respectively.

In step 430, the connected vehicle generates a mmWave communication intention message for another period that is after the first period based on the received one or more mmWave beacon signals. In embodiments, the connected vehicle 102 may generate its mmWave communication intention message for slot $S_{x+2}$ based on the received one or more mmWave beacon signals. For example, the connected vehicle 102 may generate its mmWave communication intention message for slot $S_{x+2}$ that the connected vehicle 102 intends to communicate with the connected vehicle 104 during slot $S_{x+2}$ based on the mmWave beacon signal 104-1 received from the connected vehicle 104 during the probe phase 312 of slot $S_x$. Similarly, each of the connected vehicles 104, 106, 108, 110, 112 may generate a mmWave communication intention message for slot $S_{x+2}$. For example, the connected vehicle 104 may generate its mmWave communication intention message for slot $S_{x+2}$ that the connected vehicle 104 intends to communicate with the connected vehicle 102 during slot $S_{x+2}$ based on the mmWave beacon signal 102-7 received from the connected vehicle 102 during the probe phase 312 of slot $S_x$.

In embodiments, in determining communication intentions, connected vehicles need to consider the feasibility of a mmWave path to/from the intended communicating vehicle. For example, the connected vehicle 110 may not generate a communication intention to the connected vehicle 106 even if the connected vehicle 110 received a hello beacon signal from the connected vehicle 106, if connected vehicle 110 observes that another connected vehicle 108 lies in between (i.e., lack of LOS condition), based on GPS information of the connected vehicles 106, 108, 110 that are exchanged over V2X channels.

In some embodiments, a connected vehicle's intention to communicate data to another connected vehicle may also be suppressed if the connected vehicle have not heard another connected vehicle's mmWave beacon in the past time period. For example, if the connected vehicle 108 did not receive any beacon signals from the connected vehicle 110 during the probe phase of slot $S_x$, the connected vehicle 108 does not generate any communication intention with the connected vehicle 110 for slot $S_{x+2}$.

In step 440, the connected vehicle receives one or more communication intention messages for another period from other connected vehicles. In embodiments, by referring to FIG. 5C, the connected vehicle 102 may receive V2X packets broadcasted from other connected vehicles that include communication intention messages of other connected vehicles. For example, the connected vehicle 102 may receive V2X packets from connected vehicles 104, 106, 108 that include communication intention messages of the connected vehicles 104, 106, 108 over V2X channels during slot $S_x$. The received communication intention messages of the connected vehicles 104, 106, 108 are communication intention messages for slot $S_{x+2}$. Specifically, the connected vehicle 102 receives information about which vehicle the connected vehicle 104 intends to communicate with over a mmWave channel during slot $S_{x+2}$.

In step 450, the connected vehicle obtain one or more mmWave transmission schedules for a second period overheard by the vehicle during a period prior to the first period. In embodiments, the second period is after the first period and before another period. For example, by referring to FIG. 3, the connected vehicle 102 may obtain one or more mmWave transmission schedules for slot $S_{x+1}$ which the connected vehicles 102 previously overheard during slot $S_{x-1}$. Specifically, other connected vehicles transmit V2X packets including transmission schedules for slot $S_{x+1}$ during slot $S_{x-1}$ and the connected vehicle 102 overheard the transmission schedules for slot $S_{x+1}$ during slot $S_{x-1}$.

In step 460, the connected vehicle elects, as the mmWave transmission schedule for the second period, one of the overheard one or more mmWave transmission schedules based on utility values of the overheard one or more mmWave transmission schedules. For example, the connected vehicle 102 obtain three mmWave transmission schedules for slot $S_{x+1}$ that are transmitted by the connected vehicles 104, 106, 108. Then, the connected vehicle 102 may calculate the utility values of the three mmWave transmission schedules and select one that has the largest utility value.

In step 470, the connected vehicle broadcasts, during the first period, a packet including a mmWave transmission schedule for another period generated based on the communication intention message and the one or more communication intention messages. For example, the connected vehicle 102 may a mmWave transmission schedule for slot $S_{x+2}$ based on the communication intention message for slot $S_{x+2}$ of the connected vehicle 102 and the one or more communication intention messages for slot $S_{x+2}$ of the connected vehicles 104, 106, 108. The communication intention message for slot $S_{x+2}$ of the connected vehicle 102 may indicate that the connected vehicle 102 intends to communicate with the connected vehicle 104 for slot $S_{x+2}$. The communication intention message for slot $S_{x+2}$ of the connected vehicle 104 may indicate that the connected vehicle 104 intends to communicate with the connected vehicle 102 for slot $S_{x+2}$. The communication intention message for slot $S_{x+2}$ of the connected vehicle 106 may indicate that the connected vehicle 106 intends to communicate with the connected vehicle 108 for slot $S_{x+2}$. The communication intention message for slot $S_{x+2}$ of the connected vehicle 108 may indicate that the connected vehicle 108 intends to communicate with the connected vehicle 106 for slot $S_{x+2}$.

Based on the communication intention messages, the connected vehicle 102 may generate a mmWave transmission schedule for slot $S_{x+2}$ that the connected vehicle 102 and the connected vehicle 104 perform mmWave transmissions, and the connected vehicle 106 and the connected vehicle 108 perform mmWave transmissions. In addition, the mmWave transmission schedule for slot $S_{x+2}$ may also include that the connected vehicle 110 and the connected vehicle 112 perform mmWave transmission based on communication intentions of the connected vehicles 110 and 112 for slot $S_{x+2}$. In addition, the packet also includes the mmWave transmission schedule for slot $S_{x+1}$ selected in step 460.

In step 480, the connected vehicle exchanges data with a set of vehicles via mmWave communication during an exchange phase of the first period based on a mmWave transmission schedule for the first period.

FIG. 5C depicts broadcasting of V2X packets during slot $S_x$, according to one or more embodiments shown and described herein. During slot $S_x$, each of the connected vehicles 102, 104, 106, 108, 110, 112 broadcasts packets including its transmission schedule ("TS") for slot $S_{x+2}$. For example, the connected vehicle 102 broadcasts its transmission schedule for slot $S_{x+2}$ ($TS1_{x+2}$), the connected vehicle 104 broadcasts its transmission schedule for slot Sx+2 ($TS2_{x+2}$), the connected vehicle 106 broadcasts its transmission schedule for slot $S_{x+2}$ ($TS3_{x+2}$), the connected vehicle 108 broadcasts its transmission schedule for slot $S_{x+2}$ ($TS4_{x+2}$), the connected vehicle 110 broadcasts its transmission schedule for slot $S_{x+2}$ ($TS5_{x+2}$), and the connected vehicle 112 broadcasts its transmission schedule for slot $S_{x+2}$ ($TS6_{x+2}$). Each of the connected vehicles 102, 104, 106, 108, 110, 112 may overhear other vehicles' transmission schedules and Table 1 below shows transmission schedules overheard by each connected vehicles during slot $S_x$.

TABLE 1

| Connected Vehicles | 102 | 104 | 106 | 108 | 110 | 112 |
|---|---|---|---|---|---|---|
| Overheard TS | $TS2_{x+2}$ $TS3_{x+2}$ $TS4_{x+2}$ $TS5_{x+2}$ | $TS1_{x+2}$ $TS3_{x+2}$ $TS4_{x+2}$ $TS5_{x+2}$ | $TS1_{x+2}$ $TS2_{x+2}$ $TS4_{x+2}$ $TS5_{x+2}$ | $TS1_{x+2}$ $TS2_{x+2}$ $TS3_{x+2}$ $TS5_{x+2}$ $TS6_{x+2}$ | $TS1_{x+2}$ $TS2_{x+2}$ $TS3_{x+2}$ $TS4_{x+2}$ | $TS2_{x+2}$ $TS3_{x+2}$ $TS4_{x+2}$ $TS5_{x+2}$ |

Figure 6:
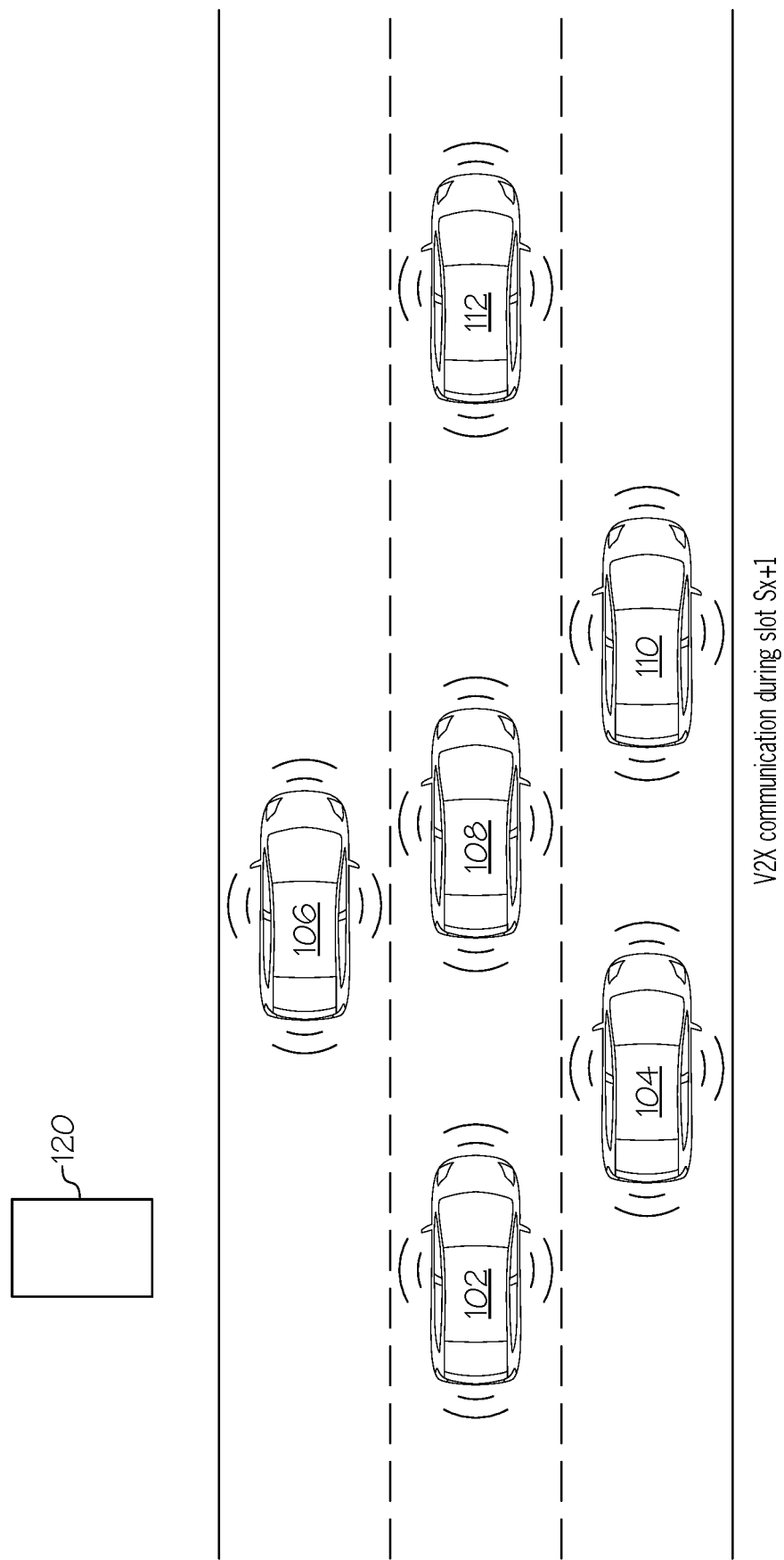
FIG. 6 depicts broadcasting of V2X packets during slot $S_{x+1}$, according to one or more embodiments shown and described herein.

FIG. 6 depicts broadcasting of V2X packets during slot $S_{x+1}$, according to one or more embodiments shown and described herein. Each of the connected vehicles 102, 104, 106, 108, 110, 112 selects the transmission schedule that has the largest utility value among the transmission schedules that each overheard during slot $S_x$. Table 2 below shows the transmission schedule for slot $S_{x+2}$ selected by each of the connected vehicles 102, 104, 106, 108, 110, 112 during slot $S_{x+1}$.

TABLE 2

| Connected Vehicles | 102 | 104 | 106 | 108 | 110 | 112 |
|---|---|---|---|---|---|---|
| Selected TS | $TS2_{x+2}$ | $TS1_{x+2}$ | $TS1_{x+2}$ | $TS1_{x+2}$ | $TS1_{x+2}$ | $TS2_{x+2}$ |

Each of the connected vehicles transmits the selected transmission schedules and overhears transmission schedules transmitted by others. Table 1 below shows transmission schedules overheard by each connected vehicles during slot $S_{x+1}$.

TABLE 3

| Connected Vehicles | 102 | 104 | 106 | 108 | 110 | 112 |
|---|---|---|---|---|---|---|
| Overheard TS | $TS1_{x+2}$ | $TS1_{x+2}$ $TS2_{x+2}$ | $TS1_{x+2}$ $TS2_{x+2}$ | $TS1_{x+2}$ $TS2_{x+2}$ | $TS1_{x+2}$ $TS2_{x+2}$ | $TS1_{x+2}$ |

Again, each of the connected vehicles 102, 104, 106, 108, 110, 112 selects the transmission schedule that has the largest utility value among the transmission schedules that each overheard during slot $S_{x+1}$. Table 4 below shows the transmission schedule for slot $S_{x+2}$ selected by each of the connected vehicles 102, 104, 106, 108, 110, 112.

TABLE 4

| Connected Vehicles | 102 | 104 | 106 | 108 | 110 | 112 |
|---|---|---|---|---|---|---|
| Selected TS | $TS1_{x+2}$ | $TS1_{x+2}$ | $TS1_{x+2}$ | $TS1_{x+2}$ | $TS1_{x+2}$ | $TS2_{x+2}$ |

As illustrated in Table 4, the initial six transmission schedules are converged to $TS1_{x+2}$.

Figure 7:
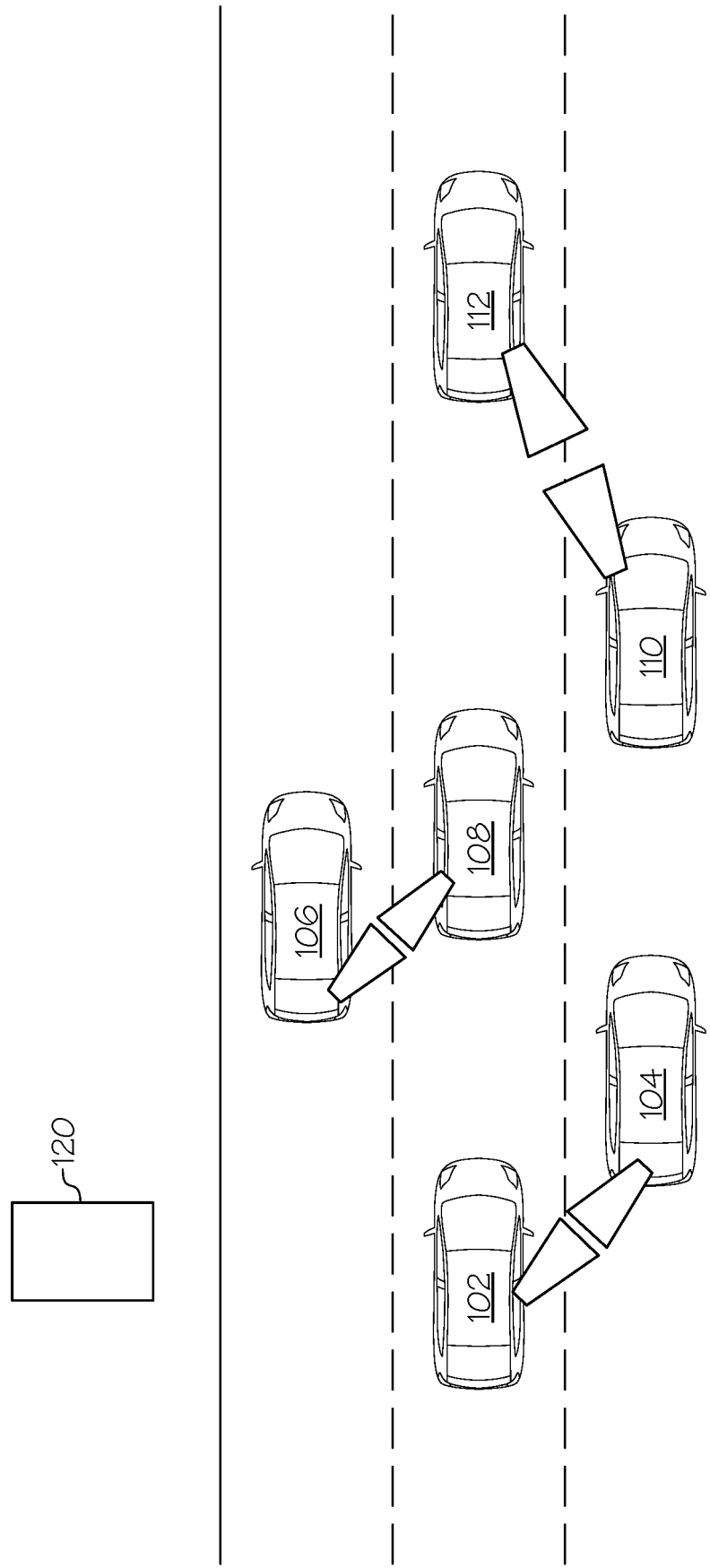
FIG. 7 depicts mmWave transmissions during slot $S_{x+2}$, according to one or more embodiments, shown and described herein.

FIG. 7 depicts mmWave transmissions during slot $S_{x+2}$, according to one or more embodiments, shown and described herein. In embodiments, the connected vehicles 102, 104, 106, 108, 110, 112 perform mmWave transmissions according to the transmission schedule for slot $S_{x+2}$ that were converged and determined during slot $S_{x+1}$. In this example, the converged transmission schedule is $TS1_{x+1}$ which was generated by the connected vehicle 102 during slot $S_x$. Based on the converged transmission schedule for slot $S_{x+2}$, the connected vehicle 102 and the connected vehicle 104 perform mmWave transmissions during slot $S_{x+2}$, the connected vehicle 106 and the connected vehicle 108 perform mmWave transmissions during slot $S_{x+2}$, and the connected vehicle 110 and the connected vehicle 112 perform mmWave transmissions during slot $S_{x+2}$.

Figure 8:
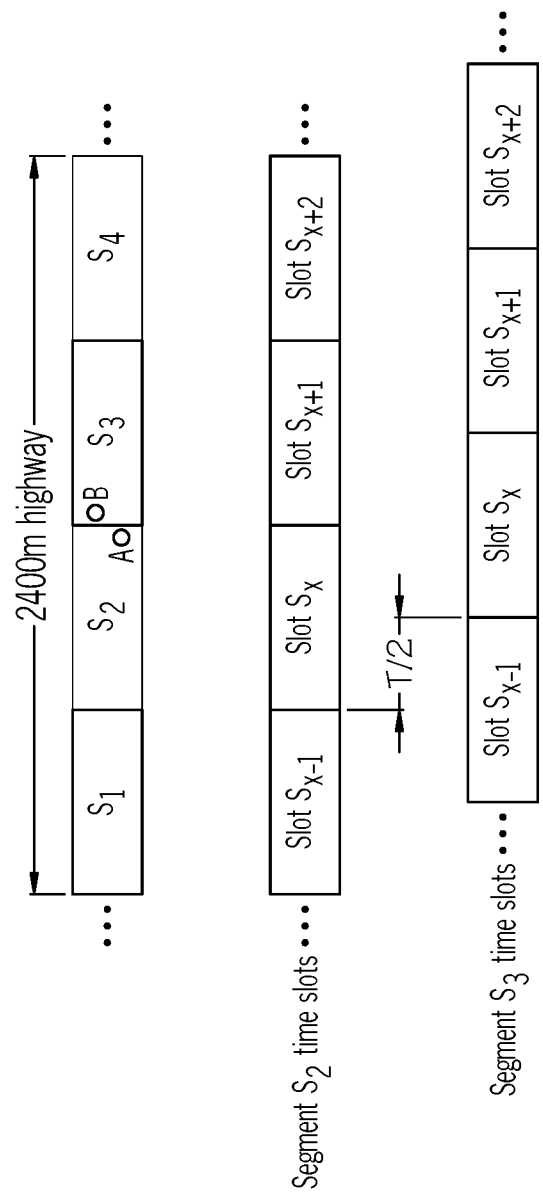
FIG. 8 depicts communication between vehicles located in different segments of a road, according to one or more embodiments shown and described herewith.

FIG. 8 depicts communication between vehicles located in different segments of a road, according to one or more embodiments shown and described herewith. FIG. 8 depicts a segmented highway. Each segment may be, for example, 600 meter long. Vehicles in the same road segment have their mmWave time slots completely aligned. Two vehicles, each from a different segment of two adjacent road segments, have their mmWave time slots' phase off by T/2 as illustrated in FIG. 8. For example, vehicle A is in segment $S_2$, and vehicle B is in segment $S_3$. The time slots for segment $S_2$ and the time slots for segment $S_3$ phase off by T/2.

Vehicles in the same road segment follow the same mmWave communication schedule obtained per the process in FIG. 4. A vehicle may conduct mmWave communication with a vehicle from a different road segment, e.g., vehicle A and vehicle B in FIG. 8, as long as they don't interfere with mmWave links scheduled per process in FIG. 4. For example, vehicles A and B may communicate over mmWave radios as long as the mmWave communication between vehicles A and B does not interfere with mmWave links scheduled for segment $S_2$ and segment $S_3$.

FIG. 9 depicts communication over mmWave channel and V2X channel over slots $S_{x-2}$ through $S_{x+2}$ from the perspective of a host vehicle, according to one or more embodiments shown and described herein.

During the probe phase of slot $S_{x-2}$, the host vehicle transmits hello beacon signals over mmWave channels, for example, as illustrated in FIG. 5A. During data exchange phase of slot $S_{x-2}$, the host vehicle performs data exchange over mmWave channels according to the transmission schedule for slot $S_{x-2}$ that were converged during slot $S_{x-3}$.

During the slot $S_{x-2}$, the host vehicle transmits V2X packets over V2X channels that include the host vehicle's communication intention for slot $S_x$, the host vehicle's transmission schedule for slot $S_x$, and an overheard transmission schedule for slot $S_{x-1}$ that has the largest utility value among transmission schedules for slot $S_{x-1}$ that the host vehicle overheard during slot $S_{x-3}$. The host vehicle's communication intention is determined based on transmitted and received hello beacon signals and the host vehicle's V2X applications' needs. The host vehicle's transmission schedule for slot $S_x$ may be computed based on the host vehicle's communication intention for slot $S_x$ and other vehicles' communication intentions for slot $S_x$ that the host vehicle overheard.

In addition, during the slot $S_{x-2}$, each of the connected vehicles including the host vehicle and other connected vehicles implements converging process on a plurality of transmission schedules for slot $S_{x-1}$ until a single transmission schedule for $S_{x-1}$ is obtained. The converged transmission schedule for slot $S_{x-1}$ is utilized for mmWave communication during slot $S_{x-1}$.

During the probe phase of slot $S_{x-1}$, the host vehicle transmits hello beacon signals over mmWave channels, for example, as illustrated in FIG. 5A. During data exchange phase of slot $S_{x-1}$, the host vehicle performs data exchange over mmWave channels according to the transmission schedule for slot $S_{x-1}$ that were converged during slot $S_{x-2}$.

During the slot $S_{x-1}$, the host vehicle transmits V2X packets over V2X channels that include the host vehicle's communication intention for slot $S_{x+1}$, the host vehicle's transmission schedule for slot $S_{x+1}$, and an overheard transmission schedule for slot $S_x$ that has the largest utility value among transmission schedules for slot $S_x$ that the host vehicle overheard during slot $S_{x-2}$. The host vehicle's communication intention is determined based on transmitted and received hello beacon signals and the host vehicle's V2X applications' needs. The host vehicle's transmission schedule for slot $S_{x+1}$ may be computed based on the host vehicle's communication intention for slot $S_{x+1}$ and other vehicles' communication intentions for slot $S_{x+1}$ that the host vehicle overheard.

In addition, during the slot $S_{x-1}$, each of the connected vehicles including the host vehicle and other connected vehicles implements converging process on a plurality of transmission schedules for slot $S_x$ until a single transmission schedule for $S_x$ is obtained. The converged transmission schedule for slot $S_x$ is utilized for mmWave communication during slot $S_x$.

During the probe phase of slot $S_x$, the host vehicle transmits hello beacon signals over mmWave channels, for example, as illustrated in FIG. 5A. During data exchange phase of slot $S_x$, the host vehicle performs data exchange over mmWave channels according to the transmission schedule for slot $S_x$ that were converged during slot $S_{x-1}$.

During the slot $S_x$, the host vehicle transmits V2X packets over V2X channels that include the host vehicle's communication intention for slot $S_{x+2}$, the host vehicle's transmission schedule for slot $S_{x+2}$, and an overheard transmission schedule for slot $S_{x+1}$ that has the largest utility value among transmission schedules for slot $S_{x+1}$ that the host vehicle overheard during slot $S_{x-1}$. The host vehicle's communication intention is determined based on transmitted and received hello beacon signals and the host vehicle's V2X applications' needs. The host vehicle's transmission schedule for slot $S_{x+2}$ may be computed based on the host vehicle's communication intention for slot $S_{x+2}$ and other vehicles' communication intentions for slot $S_{x+2}$ that the host vehicle overheard.

In addition, during the slot $S_x$, each of the connected vehicles including the host vehicle and other connected vehicles implements converging process on a plurality of transmission schedules for the slot $S_{x+1}$ until a single transmission schedule for $S_{x+1}$ is obtained. The converged transmission schedule for slot $S_{x+1}$ is utilized for mmWave communication during slot $S_{x+1}$.

The communications over the mmWave channel and the V2X channel, transmission of packets, and converging process during slot $S_{x+1}$ and slot $S_{x+2}$ are similar to the ones during slot $S_{x-2}$, $S_{x-1}$, and $S_x$ described above.

It should be understood that embodiments described herein are directed to vehicles and methods for scheduling mmWave communication among a plurality of connected vehicles. In embodiments, a vehicle includes a processor configured to: transmit a mmWave beacon signal during a probe phase of a first period; receive one or more mmWave beacon signals from one or more vehicles; generate a mmWave communication intention message for another period that is after the first period based on the received one or more mmWave beacon signals; and broadcast, during the first period, a packet including a mmWave transmission schedule for the another period generated based on the communication intention message.

According to the present disclosure, each connected vehicle transmits communication intentions and transmission schedules for a future slot to other connected vehicles, and the scheduler of each of the connected vehicles may implement converging process to select one of the transmission schedules that has the largest utility value. Then, the selected schedule is utilized for mmWave communication during the future slot. In this regard, the present system enables mmWave schedulers to work in a practical and an efficient manner.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a processor configured to:
   transmit a mmWave beacon signal during a probe phase of a first period;
   receive one or more mmWave beacon signals from one or more vehicles;
   generate a mmWave communication intention message for another period that is after the first period based on the received one or more mmWave beacon signals, the mmWave communication intention message indicating that the vehicle intends to communicate with one of the one or more vehicles over mmWave during the another period; and
   broadcast, during the first period, a packet including a mmWave transmission schedule for the another period generated based on the mmWave communication intention message.

2. The vehicle of claim 1, wherein the processor is configured to:
   receive one or more mmWave communication intention messages for the another period from other vehicles; and
   generate the mmWave transmission schedule for the another period based on the mmWave communication intention message and the one or more mmWave communication intention messages.

3. The vehicle of claim 1, wherein the processor is configured to:
generate the mmWave communication intention message for the another period further based on locations of the one or more vehicles.

4. The vehicle of claim 1, wherein the processor is configured to:
exchange data with another vehicle via mmWave communication during an exchange phase of the first period based on a mmWave transmission schedule for the first period.

5. The vehicle of claim 4, wherein the mmWave transmission schedule for the first period is selected among a plurality of transmission schedules for the first period based on utility values of the plurality of transmission schedules.

6. The vehicle of claim 5, wherein the plurality of transmission schedules were overheard by the vehicle during a period prior to the first period.

7. The vehicle of claim 1, wherein the packet further includes the mmWave communication intention message for the another period.

8. The vehicle of claim 1, wherein the packet further includes the mmWave transmission schedule for a second period that is after the first period and before the another period.

9. The vehicle of claim 8, wherein the processor is configured to:
obtain one or more mmWave transmission schedules for the second period during a period prior to the first period; and
select, as the mmWave transmission schedule for the second period, one of the one or more mmWave transmission schedules based on utility values of the one or more mmWave transmission schedules.

10. The vehicle of claim 1, wherein the packet is included in a basic safety message.

11. The vehicle of claim 1, wherein the packet is broadcasted over a 5.9 GHz V2X channel.

12. A method for scheduling mmWave transmissions, the method comprising:
transmitting, by a host vehicle, a mmWave beacon signal during a probe phase of a first period;
receiving, by the host vehicle, one or more mmWave beacon signals from one or more vehicles;
generating, by the host vehicle, a mmWave communication intention message for another period that is after the first period based on the received one or more mmWave beacon signals, the mmWave communication intention message indicating that the vehicle intends to communicate with one of the one or more vehicles over mmWave during the another period; and
broadcasting, by the host vehicle, during the first period, a packet including a mmWave transmission schedule for the another period generated based on the mmWave communication intention message.

13. The method of claim 12, further comprising:
receiving, by the host vehicle, one or more mmWave communication intention messages for the another period from other vehicles; and
generating, by the host vehicle, the mmWave transmission schedule for the another period based on the mmWave communication intention message and the one or more mmWave communication intention messages.

14. The method of claim 12, further comprising:
generating, by the host vehicle, the mmWave communication intention message for the another period further based on locations of the one or more vehicles.

15. The method of claim 12, further comprising:
exchanging, by the host vehicle, data with another vehicle via mmWave communication during an exchange phase of the first period based on a mmWave transmission schedule for the first period.

16. The method of claim 15, wherein the mmWave transmission schedule for the first period is selected among a plurality of transmission schedules for the first period based on utility values of the plurality of transmission schedules.

17. The method of claim 16, wherein the plurality of transmission schedules were overheard by the host vehicle during a period prior to the first period.

18. The method of claim 12, wherein the packet further includes the mmWave communication intention message for the another period.

19. The method of claim 12, wherein the packet further includes the mmWave transmission schedule for a second period that is after the first period and before the another period.

20. The method of claim 19, further comprising:
overhearing, by the host vehicle, one or more mmWave transmission schedules for the second period transmitted by other vehicles during a period prior to the first period; and
selecting, by the host vehicle, as the mmWave transmission schedule for the second period, one of the one or more mmWave transmission schedules based on utility values of the one or more mmWave transmission schedules.

* * * * *

UNITED STATES PATENT AND TRADEMARK OFFICE
CERTIFICATE OF CORRECTION

PATENT NO. : 11,706,754 B2
APPLICATION NO. : 17/235320
DATED : July 18, 2023
INVENTOR(S) : Hongsheng Lu et al.

It is certified that error appears in the above-identified patent and that said Letters Patent is hereby corrected as shown below:

On the Title Page

In item (72), inventor 2, city, before "Jiangsu", insert --Zhengjiang,--.

In Column 2, item (56), other publications, cite no. 1, delete "MillimeterWave" and insert --Millimeter Wave--, therefor.

In the Specification

In Column 3, Line(s) 4, delete "utilize" and insert --utilizes--, therefor.

In Column 4, Line(s) 24, after "diagram", insert --of--.

In Column 9, Line(s) 67, after "across the duration", delete "Q" and insert --Ω--, therefor.

In Column 9, Line(s) 67, after ", the duration", delete "Q" and insert --Ω--, therefor.

In Column 10, Line(s) 1, after "each of", insert --the--.

In Column 10, Line(s) 22, delete "separated" and insert --separate--, therefor.

In Column 11, Line(s) 49, delete "have" and insert --has--, therefor.

In Column 12, Line(s) 5, delete "obtain" and insert --obtains--, therefor.

In Column 12, Line(s) 22, delete "obtain" and insert --obtains--, therefor.

In Column 14, Line(s) 47, after "$S_3$", delete "," and insert --.--, therefor.

Signed and Sealed this
Twenty-ninth Day of August, 2023

Katherine Kelly Vidal
*Director of the United States Patent and Trademark Office*